United States Patent
Callaghan et al.

(10) Patent No.: US 8,250,134 B2
(45) Date of Patent: Aug. 21, 2012

(54) PROCESSING MULTIPLE REQUESTS BY A STATICALLY IDENTIFIED USER SERVER PRIOR TO USER SERVER TERMINATION

(75) Inventors: Patrick J. Callaghan, Vestal, NY (US); Tung-Sing Chong, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 11/616,498

(22) Filed: Dec. 27, 2006

(65) Prior Publication Data

US 2008/0162624 A1   Jul. 3, 2008

(51) Int. Cl.
*G06F 15/16* (2006.01)
(52) U.S. Cl. ........ 709/202; 709/201; 709/203; 709/217; 709/224; 709/227; 718/1; 718/100; 718/101; 718/102; 718/103; 718/104; 718/105; 718/106; 718/107; 718/108
(58) Field of Classification Search .......... 709/201–203, 709/217, 224, 227; 718/1, 100–108
See application file for complete search history.

(56) References Cited

U.S. PATENT DOCUMENTS

| | | | | |
|---|---|---|---|---|
| 5,854,834 | A * | 12/1998 | Gottlieb et al. | 379/114.04 |
| 6,477,569 | B1 * | 11/2002 | Sayan et al. | 709/223 |
| 6,779,017 | B1 * | 8/2004 | Lamberton et al. | 709/203 |
| 6,799,202 | B1 * | 9/2004 | Hankinson et al. | 709/219 |
| 6,886,134 | B1 * | 4/2005 | Cason | 715/760 |
| 6,948,003 | B1 * | 9/2005 | Newman et al. | 709/250 |
| 7,080,378 | B1 * | 7/2006 | Noland et al. | 718/104 |
| 7,251,815 | B2 * | 7/2007 | Donovan et al. | 718/105 |
| 7,448,079 | B2 * | 11/2008 | Tremain | 726/14 |
| 7,502,861 | B1 * | 3/2009 | Protassov et al. | 709/229 |
| 2003/0093649 | A1 | 5/2003 | Hilton | 712/41 |
| 2008/0154830 | A1 * | 6/2008 | Gschwind et al. | 706/47 |

* cited by examiner

*Primary Examiner* — Haresh N Patel
*Assistant Examiner* — Mohammad Siddiqi
(74) *Attorney, Agent, or Firm* — Steven Chiu, Esq.; Blance E. Schiller, Esq.; Heslin Rothenberg Farley & Mesiti P.C.

(57) ABSTRACT

The simultaneous processing of requests under multiple user identifiers is facilitated. The requests are processed by user servers, in which a user server has an association with a particular user. A user server has a static identity associated therewith and is capable of processing a plurality of requests prior to terminating. The requests are dispatched to the appropriate user servers via a dispatcher server coupled to the user servers.

19 Claims, 6 Drawing Sheets

PROCESSING MULTIPLE REQUESTS BY A STATICALLY IDENTIFIED USER SERVER PRIOR TO USER SERVER TERMINATION

TECHNICAL FIELD

This invention relates, in general, to facilitating processing of requests within a processing environment, and in particular, to enabling requests requested by a requestor to be processed by user servers identified within the requests in which a user server is statically identified and capable of processing multiple requests prior to termination.

BACKGROUND OF THE INVENTION

There are situations in which a requester requests services that need to be processed under the identity of multiple users. Currently, there are mechanisms for satisfying these requests.

One mechanism includes issuing a request to a general purpose server capable of processing requests under multiple user identifiers. In response to receiving a request that is to be processed under the identity of a particular user, the server assumes the identity of that user and then processes the request. After processing the request, the server switches back to a general purpose server. This mechanism has the disadvantage, however, that the requests need to be serialized from the requestor to the server, so that the requestor is only asking on behalf of one user at any point in time.

Another mechanism includes having the general purpose server, in response to receiving the request, start a user server to run the request. When that user server processes the request, it terminates. Thus, with this mechanism the user server needs to be started each time a request is received, which is time-consuming and wastes resources.

SUMMARY OF THE INVENTION

Based on the foregoing, a need exists for a capability to facilitate processing of requests that are to be run under multiple user identifiers. In particular, a need exists for a capability that enables multiple requests to be processed simultaneously by multiple user servers identified by the requests and in which a user server is statically identified and capable of processing a plurality of requests prior to termination.

The shortcomings of the prior art are overcome and additional advantages are provided through the provision of an article of manufacture that includes at least one computer usable medium having computer readable program code logic to facilitate processing of requests of a processing environment. The computer readable program code logic when executing performing, for instance, the following: obtaining, by a user server via a dispatcher server of the processing environment, a request that is to be processed for a particular user, the user server being selected by the dispatcher server and enabled to process requests for that particular user, the user server having a static identifier associating the user server with the particular user; and processing the request by the user server, wherein the user server is capable of processing a plurality of requests for the particular user prior to terminating.

Method and systems corresponding to the above-summarized article of manufacture are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for facilitating the simultaneous processing of requests to be processed under multiple user identifiers. These requests are processed by user servers, in which a user server has a static identity associated therewith (e.g., corresponding to a user identifier, such as User 1, User 2, etc.) and is capable of processing a plurality of requests prior to terminating (referred to as a long running user server). That is, the user server is not started with the intent that it must terminate after processing a single request, but instead, is capable of processing one or more requests. The user server remains running as long as it is receiving requests and/or for a configurable amount of idle time. It processes any requests forwarded to it during the time it is running. Multiple user servers may be simultaneously running and processing requests issued by one or more requestors.

In one example, a request issued by a requestor is forwarded to a dispatcher server, which is responsible for determining which user server is to process the request. Responsive to the determination, the request is forwarded by the dispatcher server to the selected user server.

Figure 1:
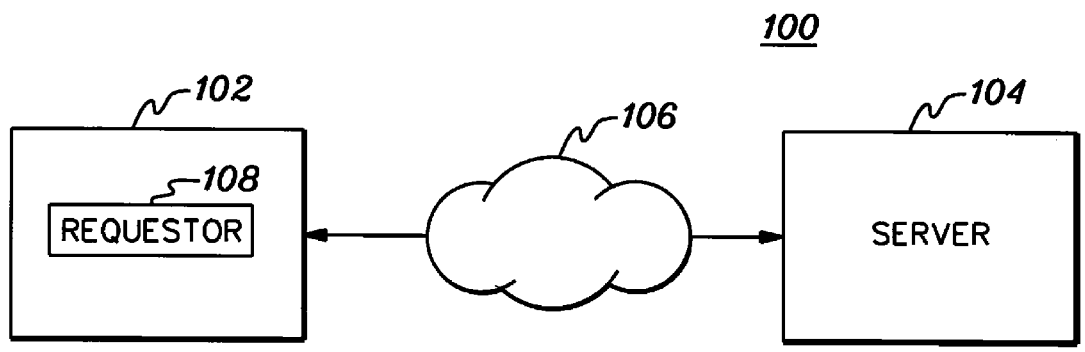
FIG. 1 depicts one embodiment of a processing environment to incorporate and use one or more aspects of the present invention.

One embodiment of a processing environment to incorporate and use one or more aspects of the present invention is described with reference to FIG. 1. Processing environment 100 includes, for instance, a processing unit 102 coupled to another processing unit 104 via a connection 106. As examples, processing unit 102 includes, for instance, a personal computer or ThinkPad notebook computer, offered by International Business Machines Corporation (IBM®), Armonk, N.Y., and server 104 includes, for instance, a pSeries® server, such as a p690 server running an AIX® operating system, offered by International Business Machines Corporation. (IBM®, pSeries®, and AIX® are registered trademarks of International Business Machines Corporation, Armonk, N.Y., U.S.A. Other names used herein may be registered trademarks, trademarks or product names of International Business Machines Corporation or other companies.) Connection 106 can be any type of connection including, for instance, a TCP/IP socket connection, an internet connection, or any other type of suitable connection.

In this example, processing unit 102 is executing one or more requesters 108 that send requests to processing unit 104, which manages those requests. Processing unit 104 is referred to herein as a server or dispatcher server. It is a general purpose server in that it does not, in this embodiment, process requests under specific user identifiers. Instead, it dispatches each request to an appropriate server for processing. Further details regarding processing unit 104 are described with reference to FIG. 2.

Figure 2:
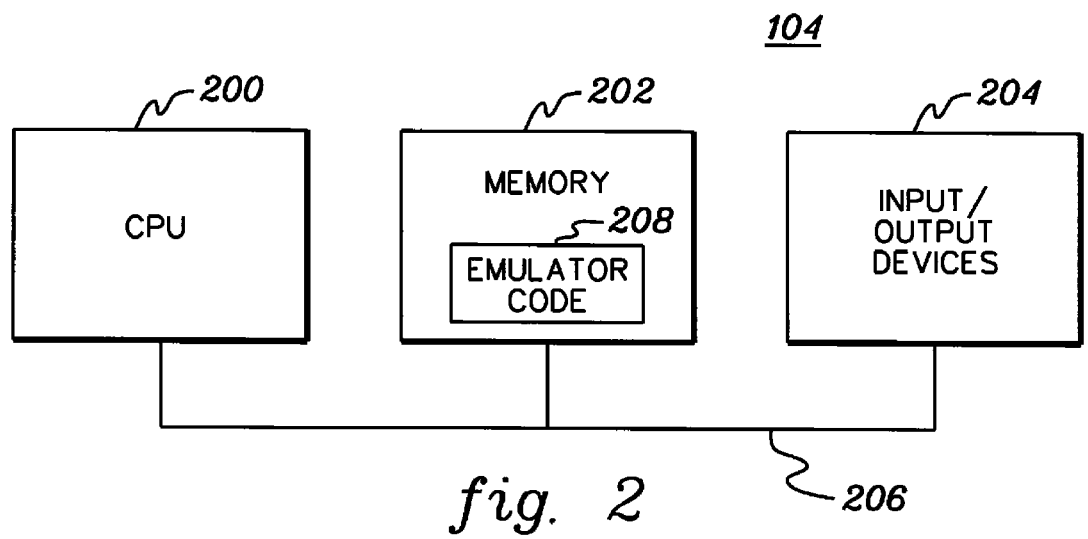
FIG. 2 depicts further details of a server of the processing environment of FIG. 1, in accordance with an aspect of the present invention.

Referring to FIG. 2, processing unit 104 includes, for instance, a central processing unit 200, a memory 202 (e.g., main memory), and one or more input/output (I/O) devices 204 coupled to one another via, for example, one or more buses 206.

Central processing unit 200 executes instructions and code that are stored in memory 202. In one particular example, the central processing unit executes emulator code 208 stored in memory 202. This code enables a processing environment configured in one architecture to emulate at least one other architecture. For instance, emulator code 208 allows the pSeries® server to emulate the z/Architecture, offered by International Business Machines Corporation.

Figure 3:
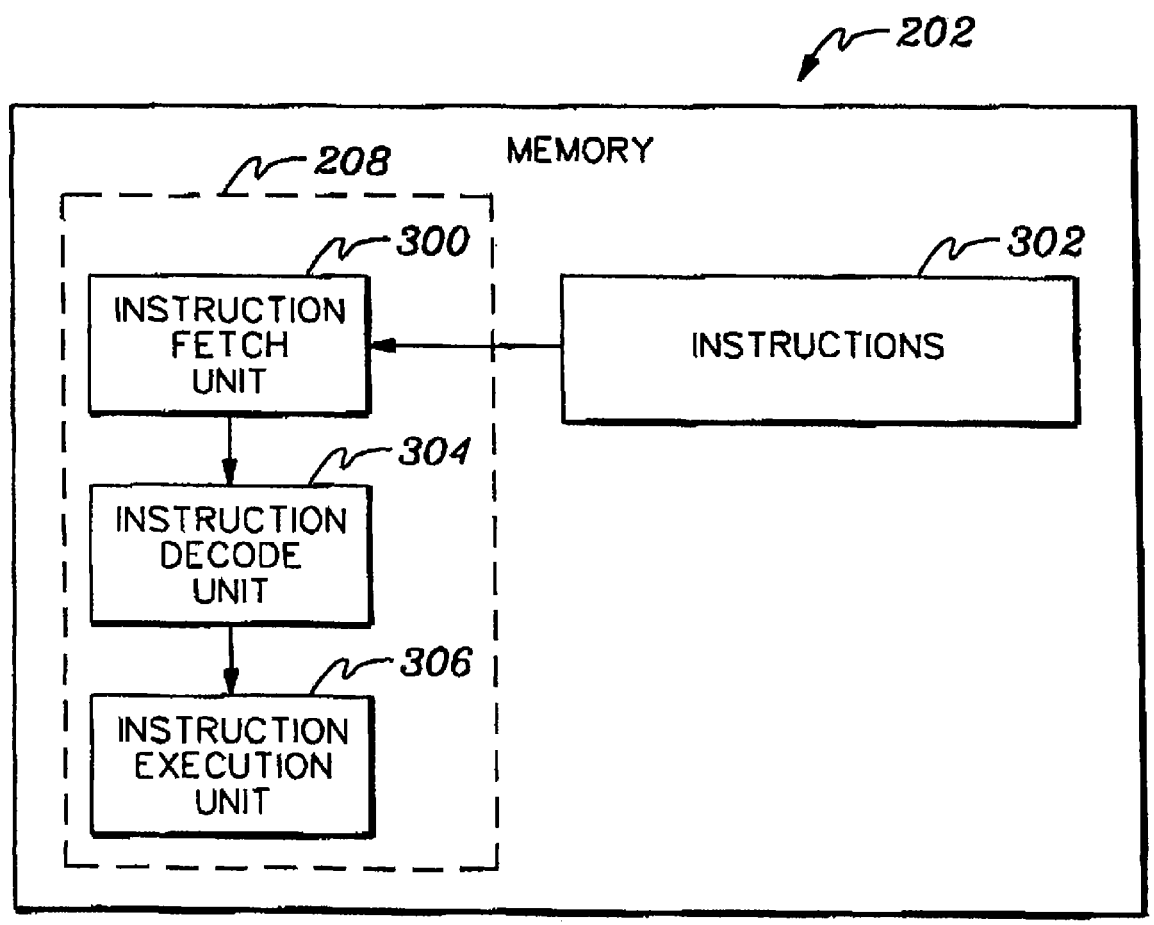
FIG. 3 depicts further details of a memory component of the server of FIG. 2, in accordance with an aspect of the present invention.

Further details relating to emulator code 208 are described with reference to FIG. 3. In one example, emulator code 208 includes an instruction fetch unit 300 to fetch an instruction 302 from memory 202 and to optionally, provide local buffering for the fetched instruction; an instruction decode unit 304 to receive the instruction from the instruction fetch unit and to determine the type of instruction that has been fetched; and an instruction execution unit 306 to execute the instruction. Execution may include loading data into a register of the central processing unit from memory 202; storing data back to memory from a register; or performing some type of arithmetic or logical operation, as determined by the decode unit. In one example, each unit is implemented in software, which is stored in memory and executed by the central processing unit. In other examples, one or more of the units or operations are implemented in firmware, hardware, software or some combination thereof.

In accordance with an aspect of the present invention, emulator code 208 is used to emulate zSeries® servers that run on the pSeries® machine. For instance, a plurality of emulated servers are started, referred to herein as per-user servers. Each per-user server is started for a particular user (e.g., User 1, User 2) and has a static identity that corresponds to that user.

Figure 4:
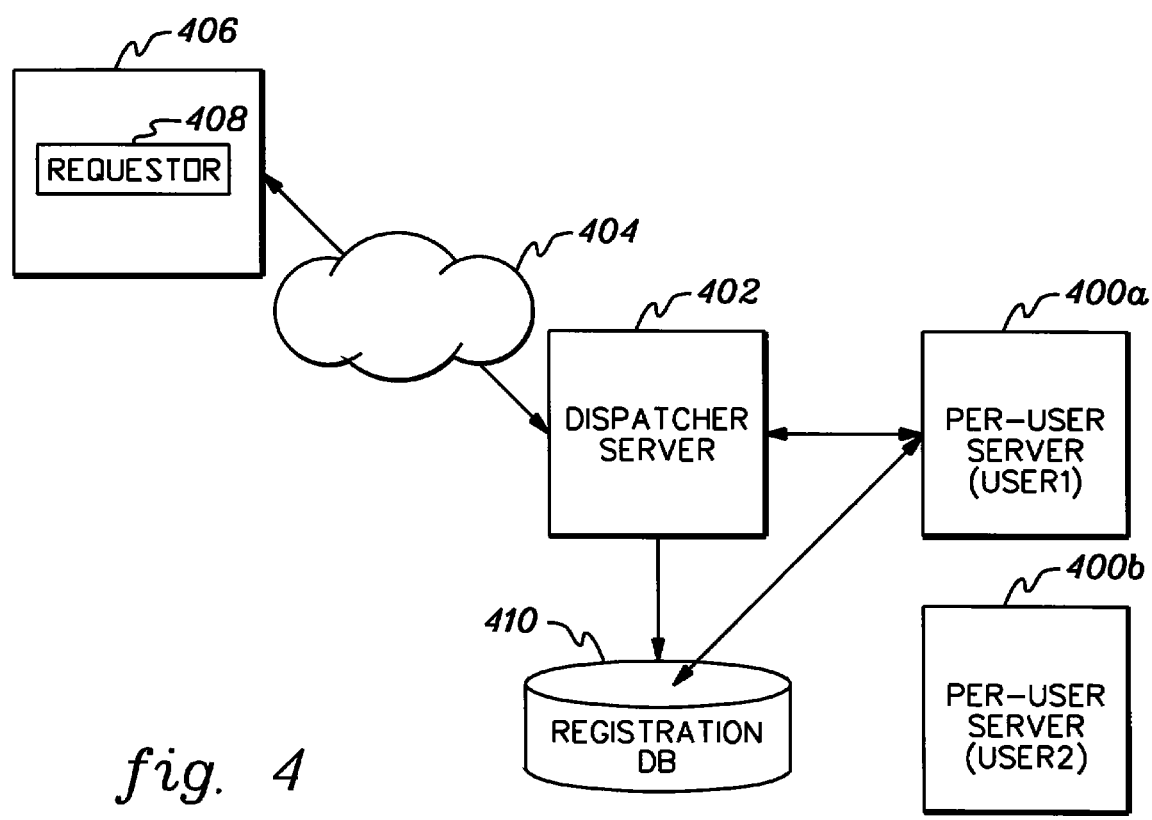
FIG. 4 depicts additional details of a processing environment to incorporate and use one or more aspects of the present invention.

Referring to FIG. 4, in one embodiment a plurality of per-user servers 400a, 400b (collectively 400) are started. In this example, each per-user server is a zSeries® system (e.g., process) running on a pSeries® machine (e.g., processing unit 104). Each per-user server processes requests that are to be processed under that user id. As examples, per-user server 400a is started for User 1 and has a static identity of User 1, and per-user server 400b is started for User 2 and has a static identity of User 2. Each per-user server only handles requests for its designated user (e.g., per-user server 400a handles requests for User 1, and per-user server 400b handles requests for User 2). Each per-user server (or a subset thereof) is capable of processing a plurality of requests for its user prior to terminating.

Per-user servers 400 are coupled to a dispatcher server 402, which is responsible for forwarding requests to the per-user servers and for starting the per-user servers, if they are not started. In one embodiment, dispatcher server 402 and per-user servers 400 are processes running on a processing unit, such as processing unit 104.

Dispatcher server 402 is further coupled, via a connection 404 (e.g., a TCP/IP socket connection; internet connection, etc.) to a processing unit 406 executing one or more requesters 408, such as graphical user interface (GUI) components. A requestor sends requests, such as application programming interface (API) requests, shared library calls or commands to be executed, to dispatcher server 402, which is on a different system than the requestor. Based on information in the request, dispatcher server 402 dispatches the request to a per-user server 400, as described below. The dispatcher employs information stored in registration database 410 to dispatch the request.

Figure 5:
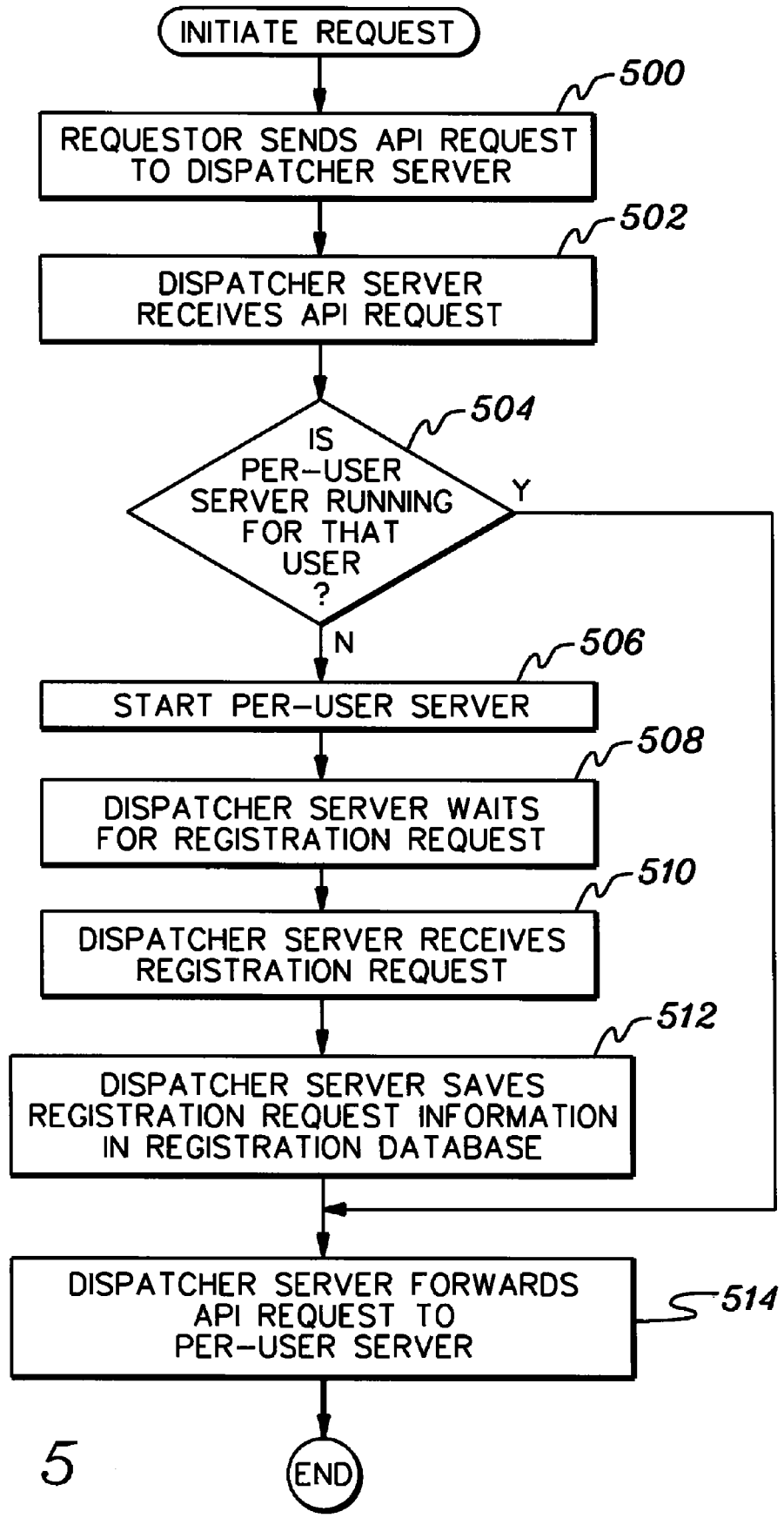
FIG. 5 depicts one embodiment of the logic associated with initiating a request, in accordance with an aspect of the present invention.
Figure 6:
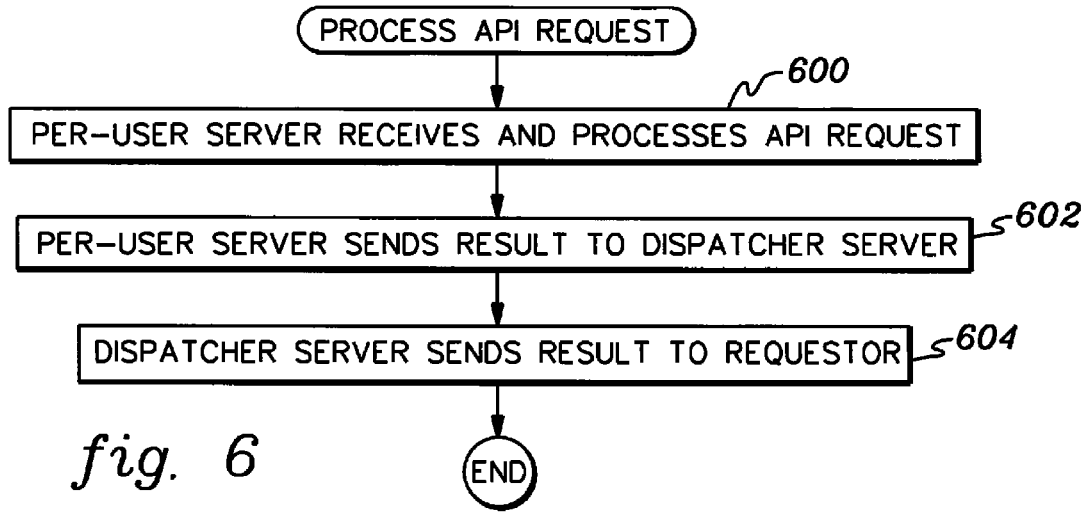
FIG. 6 depicts one embodiment of the logic associated with processing the request, in accordance with an aspect of the present invention.

Further details regarding processing a request issued by a requestor are described with reference to FIGS. 5-6. In particular, FIG. 5 depicts one embodiment of the logic associated with initiating a request, and FIG. 6 depicts one embodiment of the logic associated with processing the request. Reference is also made to FIG. 4 (reference numbers beginning with "4" are found in FIG. 4) during the description of FIGS. 5-6.

Referring to FIG. 5, initially, a requestor 408 (FIG. 4), such as a GUI component, sends a request (e.g., an API request, shared library call or command to be executed) to dispatcher server 402, STEP 502 (FIG. 5). The request includes information about the API, such as the name of the API and the types and values of the input parameters and the type of the return value. The request also includes the identifier of the user on whose behalf the API should be invoked.

The dispatcher server receives the API request, STEP 502 and determines whether a per-user server is running for that user identifier, INQUIRY 504. For example, the dispatcher server looks at the identifier of the user within the request and checks its registration database to determine whether a per-user server is currently running for that user. If a per-user server is not running for that user id, then a per-user server is started, STEP 506. This includes, for instance, invoking a start command that initiates a well-defined user process and provides the user id as a parameter. The particular process is system dependent. After the process is started, it assumes the identity of the user specified as a parameter and waits for requests to process.

In response to initiating the per-user server, the dispatcher server waits for the per-user server to send a registration request back to the dispatcher server, STEP 508. In one embodiment, if the registration request is not received in a configurable amount of time (e.g., 5 minutes or any other defined amount of time), an error is flagged. However, in response to the dispatcher server receiving the registration request, STEP 510, the dispatcher server saves the registration request information in the registration database, STEP 512. In particular, the registration request includes information about how the dispatcher server can communicate with the per-user server. For example, if a TCP/IP socket connection is used, this information includes a port number; and if an AF_local connection is used, this information includes a file name. This information is saved in the registration database.

Thereafter, or if a per-user server was already running for the user, the dispatcher server forwards the request using information in the registration database to the per-user server for processing, STEP 514. The processing of the request is described in further detail with reference to FIG. 6.

Referring to FIG. 6, the per-user server receives the request and processes that request, STEP 600. For instance, a request may include a query of the program status word (PSW) for the system running on a particular user, e.g., User 1 or User 2, etc. The per-user server receiving the request queries the PSW of its system and obtains the requested value.

Thereafter, the per-user server sends the result of the processing to the dispatcher server STEP 602, and the dispatcher server sends the result back to the requestor, STEP 604. This concludes processing of the request.

As described above, the per-user server remains running to allow it to process multiple requests prior to terminating. For instance, it remains running while it is receiving requests. If it does not receive a request within a configurable amount of idle time, then it is terminated. This processing is described in further detail with reference to FIG. 7.

Figure 7:
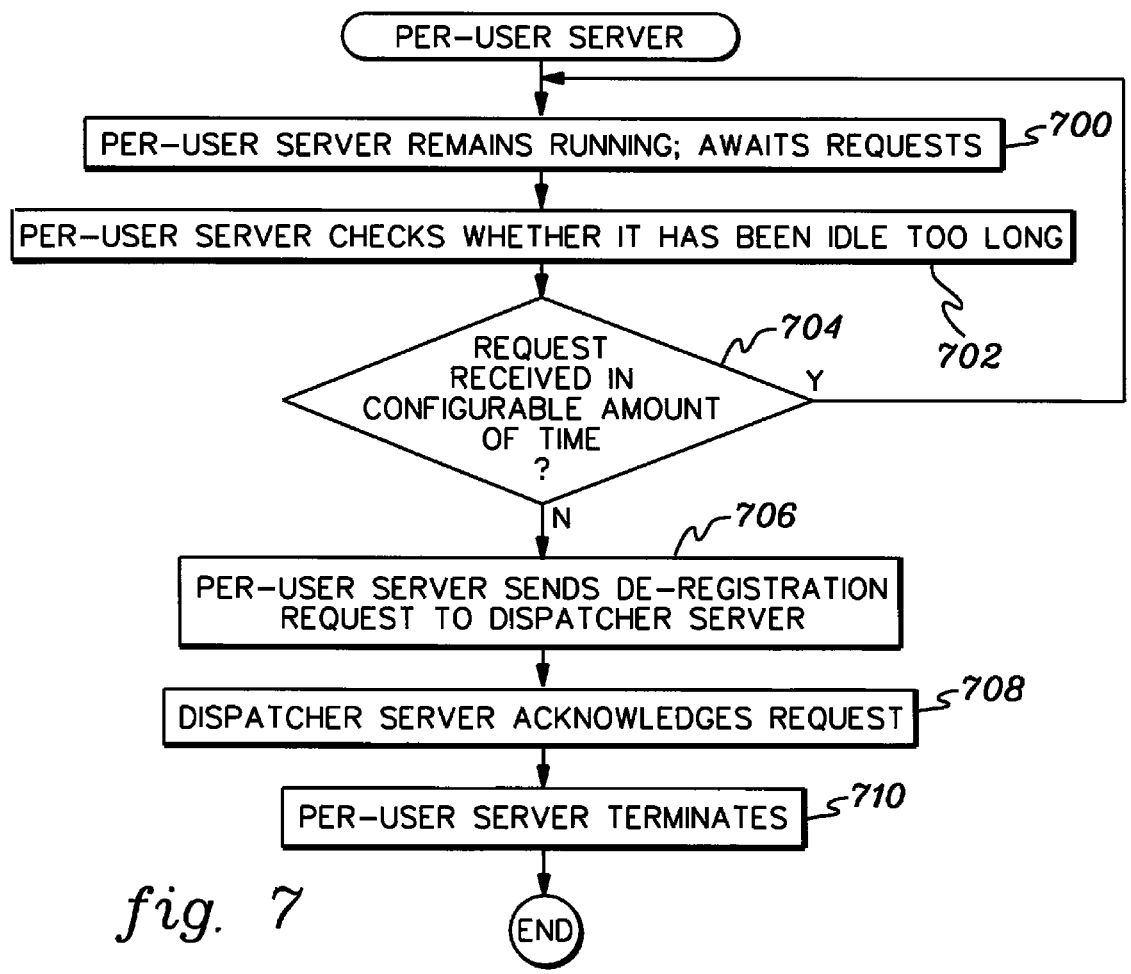
FIG. 7 depicts one embodiment of the logic associated with managing a per-user server, in accordance with an aspect of the present invention.

With reference to FIG. 7, the per-user server remains running and awaits requests, STEP 700. Periodically (e.g., every hour, or any other desired time interval), the per-user server determines whether it has received a request within a configurable amount of time, such as within 24 hours or any other desired time frame, STEP 702. This determination is made, for instance, by tracking the last received request and comparing the time to the configured time.

If a request has been received within the configured amount of time, then the per-user server remains running, INQUIRY 704. However, if the per-user server has not received a request within the configurable amount of time, the per-user server sends a deregistration request to the dispatcher server, STEP 706. The dispatcher server acknowledges this request, STEP 708, and thereafter, the per-user server terminates, STEP 710. If a request comes in for the per-user server after it terminates, then the per-user server is started once again.

Described in detail above is a capability for simultaneously processing requests by multiple users under multiple user ids. The requests are processed by individual user servers specified in the requests. The user servers are statically identified (e.g., for one particular user) and are capable of processing a plurality of requests prior to terminating.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
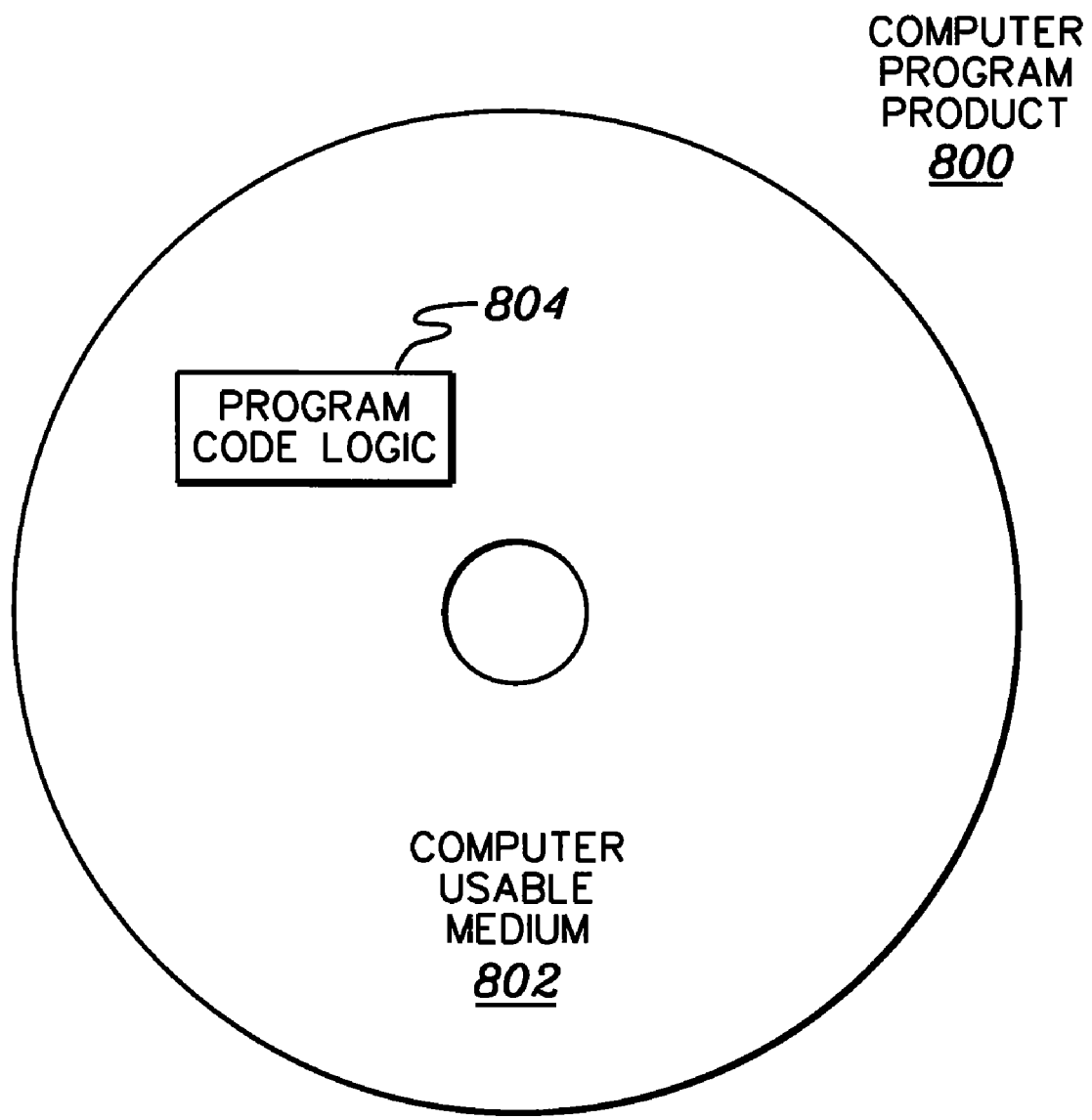
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, multiple requests issued from a particular requestor in which those requests are to be processed under multiple user identifiers are simultaneously processed by individual user servers. User servers are started for particular users and remain running to process one or more requests received for that user. Multiple user servers can be running concurrently and can be processing requests simultaneously with other user servers. A user server is statically identified in that its identity is associated with a particular user and does not change to allow it to process requests for other users. The user server is exclusive to one user, in this embodiment. Each user server is long running in that it is capable of servicing more than one request prior to terminating.

Although various embodiments are described above, these are only examples. For example, the processing environment can include more than one requester and more than one dispatcher server and/or more or less per-user servers. Further, the environment need not be based on a p/Series® architecture and may emulate environments other than the z/Architecture. Additionally, the operating system running on the p/Series® machine in this example may be other than AIX®, such as LINUX or other desired operating systems. Yet further, the processing unit executing the requesters may be other than a PC or ThinkPad offered by IBM®. Moreover, other types of requesters can request services under multiple user identifiers. Further, in other embodiments, emulation is not necessary for one or more aspects of the present invention. Many other variations are possible without departing from the spirit of the present invention.

For example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As used herein, the term "obtaining", such as obtaining a request, includes, for instance, receiving the request, having or creating the request, fetching the request, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating processing of requests of a processing environment, the computer program product comprising:
a non-transitory computer readable storage medium readable by a processor and storing instructions for execution by the processor for performing a method comprising:
obtaining, by a per-user server via a dispatcher server of the processing environment, a request that is to be processed by the per-user server for a particular user, said per-user server being selected by the dispatcher server and enabled to process requests exclusively for that particular user and not enabled to process requests for other users, said per-user server having a static identifier associating the per-user server with the particular user, and said per-user server being started based on the dispatcher server receiving the request to be processed and determining that the per-user server is not running;
processing the request by the per-user server, wherein the per-user server remains running, subsequent to processing the request;
processing one or more additional requests by the per-user server for the particular user prior to the per-user server terminating;
determining by the per-user server whether the per-user server has received another request in a configurable amount of time;
based on determining that the per-user server has not received another request in the configurable amount of time, the per-user server sending a de-registration request to the dispatcher server; and
based on the dispatcher server acknowledging the de-registration request, the per-user server terminates being enabled to process requests exclusively for said particular user.

2. The computer program product of claim 1, wherein the method further comprises:
obtaining by the dispatcher server the request from a requestor coupled to the dispatcher server;
based on obtaining the request by the dispatcher server, determining by the dispatcher server that the per-user server is the user server to process the request, said determining selecting the per-user server from one or more per-user servers of the processing environment; and
forwarding by the dispatcher server the request to the selected per-user server.

3. The computer program product of claim 2, wherein the determining comprises employing an identifier of the request to select the per-user server to process the request.

4. The computer program product of claim 2, wherein the method further comprises checking whether the per-user server to process the request is running, and based on the checking indicating that it is not running, starting the per-user server.

5. The computer program product of claim 4, wherein the checking comprises consulting, by the dispatcher server, a registration database to determine whether the per-user server is running.

6. The computer program product of claim 4, wherein the method further comprises:
receiving by the dispatcher server, based on the starting, information from the per-user server relating to the per-user server; and
employing the information by the dispatcher server to forward the request to the per-user server.

7. The computer program product of claim 1, wherein the method further comprises:
providing a result of processing the request to the dispatcher server; and
sending the result from the dispatcher server to a requestor of the request, the requestor of the request forwarding the request to the dispatcher server.

8. The computer program product of claim 7, wherein the requestor comprises a graphical user interface component and the request comprises an application programming interface request, and wherein the graphical user interface component is on a processing unit of the processing environment different from a processing unit executing the dispatcher server.

9. The computer program product of claim 1, wherein the request is of a requestor, and wherein the method further comprises concurrently processing by multiple per-user servers multiple requests of the requestor.

10. The computer program product of claim 1, wherein the per-user server comprises an emulated server of one architecture running on a processing unit of another architecture.

11. A method of facilitating processing of requests of a processing environment, said method comprising:
obtaining, by a per-user server via a dispatcher server of the processing environment, a request that is to be processed by the per-user server for a particular user, said per-user server being selected by the dispatcher server and enabled to process requests exclusively for that particular user and not enabled to process requests for other users, said per-user server having a static identifier associating the per-user server with the particular user, wherein said per-user server associated with the particular user is initiated based on the dispatcher server receiving the request to be processed and determining that the per-user server is not running, and wherein based on initiating the per-user server, the per-user server sends a registration request to the dispatcher server, the registration request including information on how the dispatcher server is to communicate with the per-user server;
processing the request by the per-user server, wherein the per-user server remains running subsequent to processing the request;
processing one or more additional requests by the per-user server for the particular user prior to the per-user server terminating;
determining by the per-user server whether the per-user server has received another request in a configurable amount of time;
based on determining that the per-user server has not received another request in the configurable amount of time, the per-user server sending a de-registration request to the dispatcher server; and based on the dispatcher server acknowledging the de-registration request, the per-user server terminates being enabled to process requests exclusively for said particular user.

12. The method of claim 11, further comprising:
providing a result of processing the request to the dispatcher server; and
sending the result from the dispatcher server to a requestor of the request, the requestor of the request forwarding the request to the dispatcher server.

13. The method of claim 11, wherein the request is of a requestor, and further comprising concurrently processing by multiple per-user servers multiple requests of the requestor.

14. The method of claim 11, wherein the per-user server comprises an emulated server of one architecture running on a processing unit of another architecture.

15. A computer system for facilitating processing of requests of a processing environment, said computer system comprising:
a memory; and
a processor in communications with the memory, wherein the computer system is configured to perform a method, said method comprising:
obtaining, by a per-user server via a dispatcher server of the processing environment, a request that is to be processed by the per-user server for a particular user, said per-user server being selected by the dispatcher server and enabled to process requests exclusively for that particular user and not enabled to process requests for other users, said per-user server having a static identifier associating the per-user server with the particular user, and said per-user server being started based on the dispatcher server receiving the request to be processed and determining that the per-user server is not running;
processing the request by the per-user server, wherein the per-user server remains running, subsequent to processing the request;
processing one or more additional requests by the per-user server for the particular user prior to the per-user server terminating;
determining by the per-user server whether the per-user server has received another request in a configurable amount of time;
based on determining that the per-user server has not received another request in the configurable amount of time, the per-user server sending a de-registration request to the dispatcher server; and
based on the dispatcher server acknowledging the de-registration request, the per-user server terminates being enabled to process requests exclusively for said particular user.

16. The computer system of claim 15, wherein the method further comprises:
obtaining by the dispatcher server the request from a requestor coupled to the dispatcher server;
based on obtaining the request by the dispatcher server, determining by the dispatcher server that the per-user server is the user server to process the request, said determining selecting the per-user server from one or more per-user servers of the processing environment; and
forwarding by the dispatcher server the request to the selected per-user server.

17. The computer system of claim 15, wherein the method further comprises:
providing a result of processing the request to the dispatcher server; and
sending the result from the dispatcher server to a requestor of the request, the requestor of the request forwarding the request to the dispatcher server.

18. A computer program product for facilitating processing of requests of a processing environment, the computer program product comprising:
a non-transitory computer readable storage medium readable by a processor and storing instructions for execution by the processor for performing a method comprising:
receiving by a dispatcher server a request to be processed by a per-user server for a particular user, said request including an identifier of the particular user;
based on receiving the request, determining by the dispatcher server whether the per-user server is running for the particular user identified in the request, said per-user server having a static identifier associating the per-user server with the particular user and enabled to process requests exclusively for that particular user and not enabled to process requests for other users;
initiating the per-user server associated with the particular user, based on determining that the per-user server is not running; and
based on initiating the per-user server:
the dispatcher server waiting for the per-user server to send a registration request back to the dispatcher server;
obtaining by the dispatcher server the registration request from the per-user server, said registration request including information on how the dispatcher server is to communicate with the per-user server;
forwarding the request to be processed from the dispatcher server to the per-user server using the information, the per-user server to process the request and to remain running subsequent to processing the request; and
forwarding one or more additional requests to the per-user server prior to the per-user server terminating, the per-user server to process the one or more additional requests prior to terminating.

19. The method of claim 18, wherein the method further comprises:
receiving by the dispatcher server, from the per-user server, a de-registration request indicating that the per-user server has not received another request in a configurable amount of time; and
acknowledging, by the dispatcher server, the de-registration request.

* * * * *